US008943326B2

(12) United States Patent
Tamkhane et al.

(10) Patent No.: US 8,943,326 B2
(45) Date of Patent: Jan. 27, 2015

(54) SYSTEMS AND METHODS FOR ACCESSING A TAMPERPROOF STORAGE DEVICE IN A WIRELESS COMMUNICATION DEVICE USING BIOMETRIC DATA

(75) Inventors: Pravin Sajan Tamkhane, Maharashtra (IN); Shrinivas Bairi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 857 days.

(21) Appl. No.: 12/022,117

(22) Filed: Jan. 29, 2008

(65) Prior Publication Data
US 2009/0193519 A1    Jul. 30, 2009

(51) Int. Cl.
G06F 21/00    (2013.01)
G07C 9/00    (2006.01)
G06F 21/78    (2013.01)
G06F 21/79    (2013.01)

(52) U.S. Cl.
CPC ............ *G07C 9/00158* (2013.01); *G06F 21/78* (2013.01); *G06F 21/79* (2013.01)
USPC ................ 713/186; 726/19; 726/27; 713/194

(58) Field of Classification Search
None
See application file for complete search history.

(56) References Cited

U.S. PATENT DOCUMENTS

| 6,055,637 | A  * | 4/2000  | Hudson et al. ............... 726/20 |
| 6,580,815 | B1   | 6/2003  | Grajewski et al. |
| 6,957,338 | B1 * | 10/2005 | Sumino ...................... 713/186 |
| 7,275,685 | B2 * | 10/2007 | Gray et al. .................. 235/380 |
| 7,483,942 | B2 * | 1/2009  | Nakayama et al. .......... 709/203 |
| 7,877,790 | B2 * | 1/2011  | Vishik et al. .................... 726/5 |
| 2002/0140542 | A1 | 10/2002 | Prokoski et al. |
| 2007/0057763 | A1 | 3/2007 | Blattner et al. |
| 2007/0073619 | A1 | 3/2007 | Smith |
| 2007/0073715 | A1 * | 3/2007 | Tang ............................. 707/10 |
| 2007/0079135 | A1 * | 4/2007 | Saito ........................... 713/183 |
| 2007/0255963 | A1 * | 11/2007 | Pizano et al. ................ 713/189 |
| 2008/0046997 | A1 * | 2/2008 | Wang ............................ 726/16 |

FOREIGN PATENT DOCUMENTS

| DE | 10100188 | 7/2002 |
| GB | 2420098 | 5/2006 |

(Continued)

OTHER PUBLICATIONS

LG Telecom Selects AuthenTec Fingerprint Sensor for its First Biometric Cell Phone—the New LP3800, Melbourne, Fla. & Seoul, Korea—(Business Wire), Sep. 13, 2004.

(Continued)

*Primary Examiner* — Kaveh Abrishamkar
(74) *Attorney, Agent, or Firm* — Won Tae Kim (57) ABSTRACT

A novel system and method for accessing data stored in a secure or tamperproof storage device in a wireless communication device is provided. The wireless communication device may include a biometric sensor for capturing a biometric sample of the user. The captured biometric sample may be compared to known biometric samples of users stored in a memory device of the wireless communication device. If the captured biometric sample matches one of the known biometric samples, the user is allowed access to the tamperproof storage device for a preset amount of time. The user may delete existing data, add new data, modify existing data or view existing data stored in the tamperproof storage device.

35 Claims, 7 Drawing Sheets

(56) References Cited

FOREIGN PATENT DOCUMENTS

| | | |
|---|---|---|
| JP | 2003173321 A | 6/2003 |
| JP | 2005222095 A | 8/2005 |
| JP | 2006155159 A | 6/2006 |
| JP | 2006172180 A | 6/2006 |
| JP | 2007241487 A | 9/2007 |
| JP | 2007265176 A | 10/2007 |
| TW | 385400 B | 3/2000 |
| TW | 200643715 | 12/2006 |
| WO | WO2007080406 | 7/2007 |

OTHER PUBLICATIONS

Biometrics in the Here and Now, Scott Moddy, TechNewsWorld, Oct. 10, 2007.
Survey: U.S. Cell Phone Users Want M-Commerce and Biometric Protection, Las Vegas, Nevada/Melbourne, Florida, Apr. 5, 2006.
Pantech launches 'fortune-telling' biometric cell phone with AuthenTec Fingerprint Sensor, Thursday, Oct. 6 2005.
Taiwan Search Report—TW098103146—TIPO—Aug. 30, 2012.
International Search Report and Written Opinion—PCT/US09/032169, International Searching Authority—European Patent Office, Apr. 2, 2009.

* cited by examiner

SYSTEMS AND METHODS FOR ACCESSING A TAMPERPROOF STORAGE DEVICE IN A WIRELESS COMMUNICATION DEVICE USING BIOMETRIC DATA

BACKGROUND

1. Field

Various features pertain to wireless communication devices. At least one aspect pertains to a system and method for accessing a tamperproof storage device in a wireless communication device using biometric data.

2. Background

Authentication data, such as usernames and passwords, are being increasingly used to control access to resources, such as computer and email accounts, and to prevent unauthorized access to important information or data stored in the accounts. The usernames and passwords also help to maintain security of personal and sensitive information and enable a user to use various Internet services securely, such as purchasing items. Passwords are kept secret from those not allowed access to the information and accounts, and those wishing to gain access are tested on whether or not they know the password and are granted or denied access accordingly.

To maintain the highest level of security, users may need to change their passwords every few days. However, users typically have many different accounts, each having different usernames and passwords. Due to the voluminous number of accounts a user has, it is difficult for the user to remember all the different usernames and passwords, especially if they are being changed every few days. If the user uses the same username and/or password for the different accounts, the risk of unauthorized access to the accounts increases because if the username and password is misappropriated, access will be gained to all the accounts of the user using that username and password.

In view of the security risks in using a single username and/or password for all accounts and the difficulty in remembering different usernames and/or passwords for all the accounts, there is a need for a system and method for storing data, such as usernames and passwords, in a tamperproof storage device of a wireless communication device. Furthermore, there is also a need for providing a user of the wireless communication device access to the data in the tamperproof storage device by authenticating the identity of the user and preventing unauthorized access by others. Consequently, a system and method is needed for storing sensitive information or data, such as usernames and passwords, credit card numbers, bank account numbers, and the like, in a tamperproof storage device of a wireless communication device that may be accessible by the user but to no one else.

SUMMARY

One feature provides a system and method for accessing a tamperproof storage device in a wireless communication device using biometric data.

A wireless communication device may include a biometric sensor, a memory device coupled to the biometric sensor, a processing circuit coupled to the memory device, and a tamperproof storage device protected from external access, coupled to the processing circuit. The biometric sensor may be used for capturing a biometric sample of a user trying to access the tamperproof storage device and may be a fingerprint scanner, an iris scanner, facial recognition device, a hand scanner and a voice recognition device. The memory device may be used for storing known biometric samples of users. The processing circuit may be configured to (a) compare the captured biometric sample to the known biometric sample stored in the memory device, (b) extract data from a tamperproof storage device if the captured biometric sample matches the known biometric sample, and (c) present the extracted data to the user for a preset amount of time.

The preset amount of time may be set by the processing circuit or may be user defined and the data may no longer be available to the user when the preset amount of time has lapsed. The tamperproof storage device may be used for storing personal and sensitive information or data and may be a protected area within the memory device or may be a separate memory component.

A user may input data into the temporary storage device using a user interface. In one embodiment, the user interface may be a keypad. The data may include one or more credit card numbers, passwords, secret locker code numbers, automated teller machine (ATM) personal identification numbers (PIN), insurance policy numbers, social security numbers and/or driver license numbers.

In one embodiment, the extracted data may be presented to the user on a display of the wireless communication device.

In one embodiment, the wireless communication device may further include an authentication module within the processing circuit for comparing the captured biometric sample of the user to the known biometric sample of the user to authenticate the identity of the user.

Similarly, a method operational on a wireless communication device is also provided, comprising: (a) capturing a biometric sample of a user, (b) comparing the captured biometric sample to a known biometric sample of the user stored in a memory device, (c) extracting data from a tamperproof storage device if the captured biometric sample matches the known biometric sample, and (d) presenting the extracted data to the user for a preset amount of time.

Consequently, a wireless communication device is provided comprising: (a) means for capturing a biometric sample of a user, (b) means for storing a known biometric sample of the user, (c) means for comparing the captured biometric sample to the known biometric sample stored in a memory device, (d) means for extracting data from a tamperproof storage device if the captured biometric sample matches the known biometric sample, (e) and means for presenting the extracted data to the user for a preset amount of time.

Similarly, a processor readable medium is provided having one or more instructions for accessing data in a wireless communication device which when executed by a processor causes the processor to (a) capture a biometric sample of a user, (b) compare the captured biometric sample to a known biometric sample stored in a memory device of the wireless communication device, (c) extract data from a tamperproof storage device in the wireless communication device if the captured biometric sample matches the known biometric sample, and (d) present the extracted data to the user for a preset amount of time.

Additionally, a circuit is provided to (a) capture a biometric sample of a user, (b) compare the captured biometric sample to a known biometric sample stored in a memory device of the wireless communication device, (c) extract data from a tamperproof storage device in the wireless communication device if the captured biometric sample matches the known biometric sample, and (d) present the extracted data to the user for a preset amount of time.

BRIEF DESCRIPTION OF THE DRAWINGS

The features, nature, and advantages of the present features may become more apparent from the detailed description set forth below when taken in conjunction with the drawings in which like reference characters identify correspondingly throughout.

FIG. 5 (comprising FIGS. 5A, 5B, and 5C) is a flow diagram illustrating a method operational in a wireless communication device for deleting, adding, modifying or viewing data in a tamperproof storage device of the wireless communication device.

DETAILED DESCRIPTION

In the following description, specific details are given to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, structures and techniques may be shown in detail in order not to obscure the embodiments.

Also, it is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine readable mediums for storing information. The term "machine readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One feature provides a system and method for accessing data stored in a secure or tamperproof storage device in a wireless communication device. The tamperproof storage device may be a protected area within a memory device of the wireless communication device or may be a separate component or module within the wireless communication device. In particular, a method is provided for allowing a user access to data, such as usernames and passwords, credit card numbers, bank account numbers, and the like, stored in a secure, tamperproof device within a wireless communication device and prevent access to unauthorized users.

In yet another feature, the wireless communication device may include a biometric sensor for capturing a biometric sample of the user. The captured biometric sample may be compared to known biometric samples of users stored in the memory device of the wireless communication device. If the captured biometric sample matches one of the known biometric samples, the user is allowed access to the tamperproof storage device for a preset amount of time. When the preset amount of time has lapsed, access to the tamperproof storage device is terminated. The user may delete existing data, add new data, modify existing data or view existing data stored in the tamperproof storage device. In this manner, a user may store information or data within the wireless communication device that may only be accessed by the user as biometric samples are unique to each user.

Figure 1:
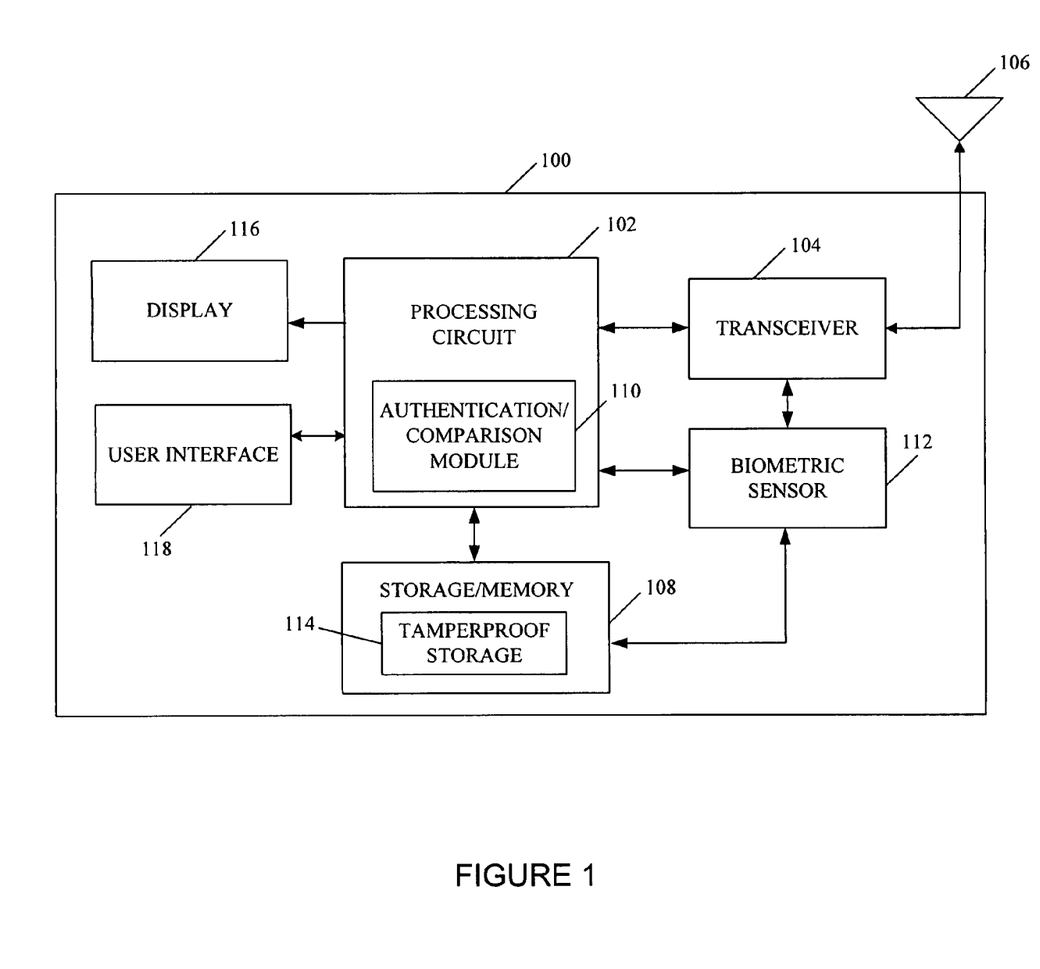
FIG. 1 is a block diagram illustrating a wireless communication device configured to authenticate a user requesting access to data stored in a tamperproof storage device of the wireless communication device.

FIG. 1 is a block diagram illustrating a wireless communication device 100 configured to authenticate a user requesting access to a tamperproof storage device of the wireless communication device 100. Various examples of a wireless communication device include a mobile terminal, a personal digital assistant, a mobile phone or cell phone. The wireless communication device 100 may include a processing circuit 102 coupled to a wireless communication interface or a transceiver 104. The transceiver 104 may be coupled to an antenna 106 to communicate with access nodes, in a wireless communication system, and a memory device 108 to store known biometric samples of users, i.e. biometric samples previously provided by one or more users for verifying or authenticating the identity of the users. The known biometric samples may include, but are not limited to, voice characteristics, iris patterns, facial features, fingerprints and palm prints.

The processing circuit 102 (e.g., processor, processing module, etc.) may include an authentication or comparison module 110 configured to authenticate a user trying to access information or data stored in the wireless communication device 100 by comparing the known biometric samples stored in the memory device 108 to a biometric sample of a user captured by a biometric sensor 112. The biometric sensor 112 may include, but is not limited to, a fingerprint scanner, an iris scanner, a facial recognition device, a hand scanner and a voice recognition device. The wireless communication device 100 may include a tamperproof storage device 114, located within the memory device 108, for storing data or sensitive information, such as credit card numbers, passwords, secret locker code numbers, automated teller machine (ATM) personal identification numbers (PIN), insurance policy numbers, bank account numbers, social security numbers, driver license numbers and the like.

The tamperproof storage device 114 may be protected from external access, but may be available to an authentication application of the wireless communication device 100. The processing circuit 102 may be configured to add data to the tamperproof storage device 114. The processing circuit 102 may also be configured to allow new users to add their biometric sample to the known biometric samples stored in the memory device 108 so that new users may be authenticated by the authentication application so that they may access and store data in the tamperproof storage device 114.

The wireless communication device 100 may also include a display 116, such as a liquid crystal display, for displaying data, such as the data stored in the tamperproof storage device 114, to a user for a preset amount of time. When the preset amount of time has lapsed, the data is cleared from the display 116 and access to the tamperproof storage device 114 is terminated. The preset amount of time may be user defined or may be set by the authentication application. The user may access the tamperproof storage device 114 after termination by providing another biometric sample to authenticate his identity. If authentication is successful, the user will be granted access again for the preset amount of time.

The wireless communication device 100 may also include a user interface 118, coupled to the processing circuit 102, for allowing the user to input data for storage in the memory device 108 or in the tamperproof storage device 114 of the memory device 108. The user interface 118 may include, but is not limited to, a keypad, a keyboard, a microphone and a camera. The wireless communication device 100 may allow authorized (i.e. authenticated) users to securely access and store data in the tamperproof storage device 114 and prevent unauthorized users from accessing the data.

Figure 2:
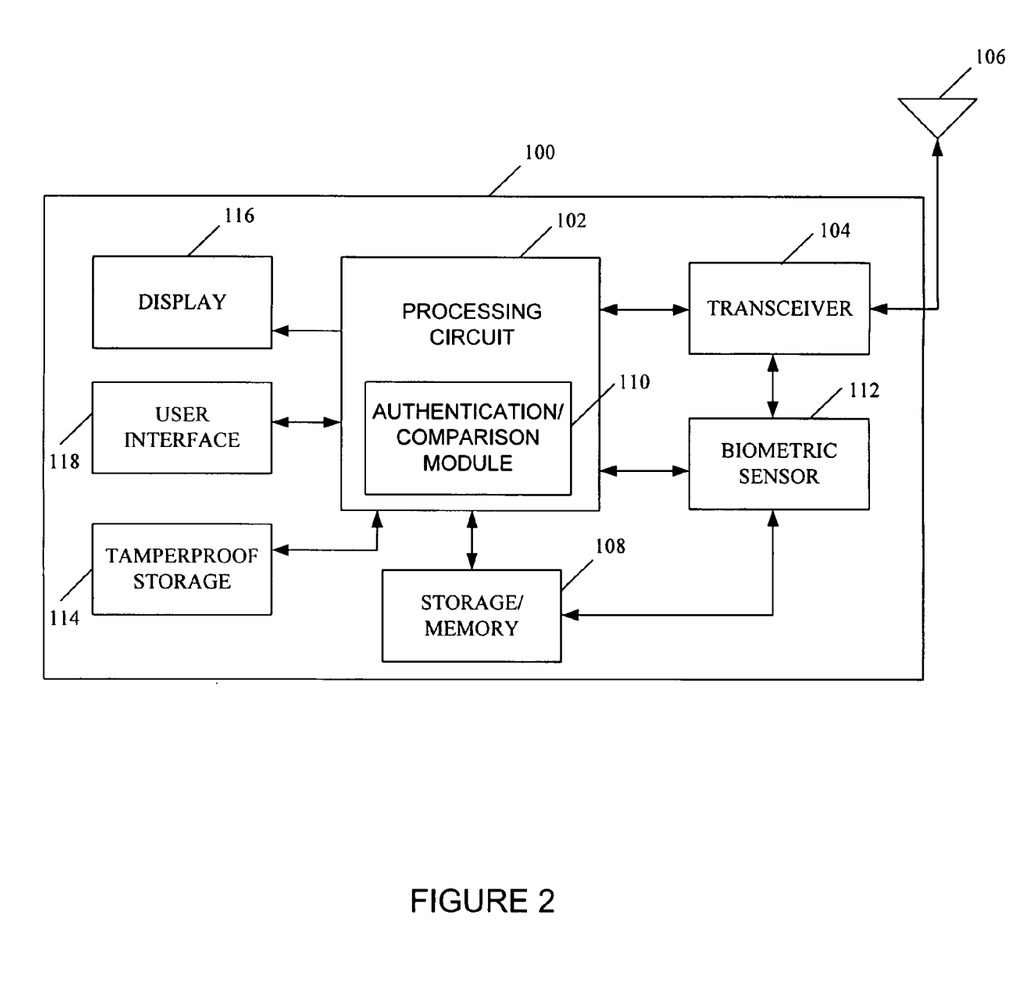
FIG. 2 illustrates an alternative configuration of the wireless communication device in FIG. 1.

FIG. 2 illustrates an alternative configuration of the wireless communication device 100 in FIG. 1. In this configuration, the tamperproof storage device 114 is a separate memory component within the wireless communication device and is not located within the memory device 108.

Figure 3:
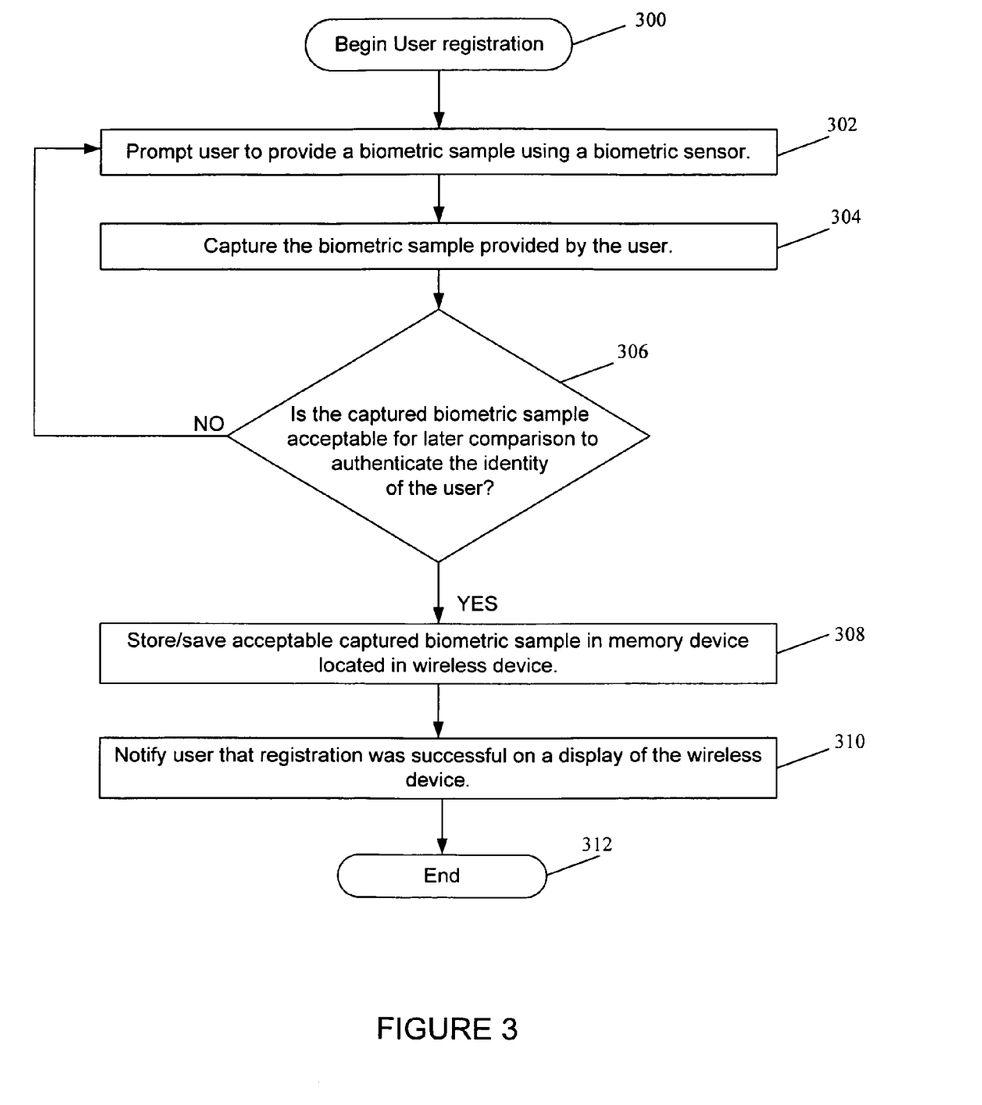
FIG. 3 is a flow diagram illustrating a method operational in a wireless communication device for registering a user with an authentication application of the wireless communication device.

FIG. 3 is a flow diagram illustrating a method operational in a wireless communication device for registering a user with an authentication application of the wireless communication device 300. Users may register with the authentication application which authenticates users and provides them access to the tamperproof storage device for accessing stored data as well as storing new data.

Initially, the wireless communication device may prompt the user to provide a biometric sample using a biometric sensor 302. The biometric sensor in the wireless communication device may capture the biometric sample provided by the user 304. The wireless communication device may determine whether the captured biometric sample is acceptable for later comparison to a known biometric sample of the user to verify or authenticate the identity of the user 306. If the captured biometric sample is unacceptable, the wireless communication device may prompt the user to provide a new biometric sample 302. If the captured biometric sample is acceptable, the captured biometric sample may be stored or saved in a memory device in the wireless communication device 308. Once the captured biometric sample of the user is stored, the user may be notified that registration was successful on a display of the wireless communication device 310. The registration process may then be ended 312.

Figure 4:
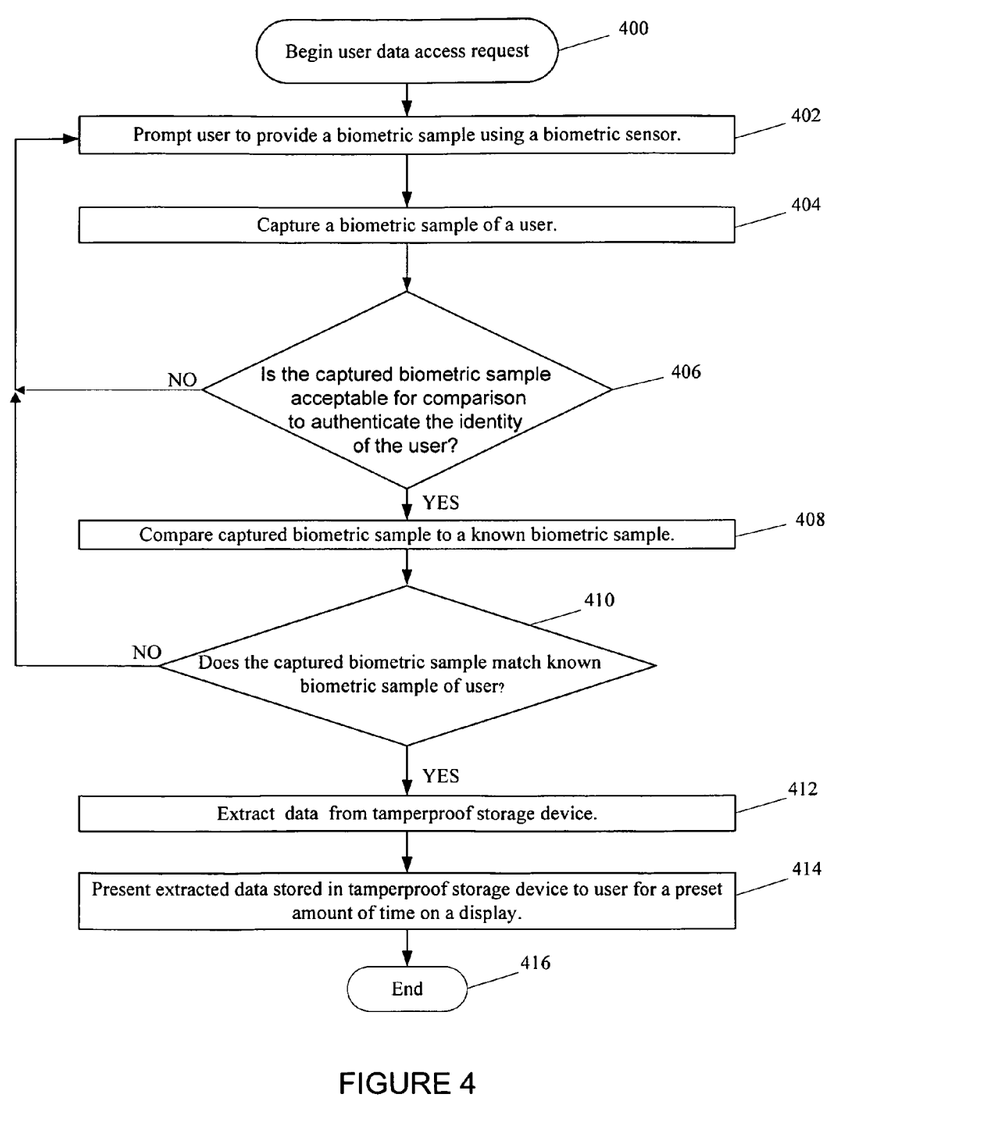
FIG. 4 is a flow diagram illustrating a method operational in a wireless communication device for accessing data in a tamperproof storage device of the wireless communication device.

FIG. 4 is a flow diagram illustrating a method operational in a wireless communication device for accessing data in a tamperproof storage device of the wireless communication device. The tamperproof storage device may be protected from external access, but may be available to an authentication application of the wireless communication device. Users may register with the authentication application which authenticates users and provides them access to the data in the tamperproof storage device.

As part of a user data access request 400, the wireless communication device may prompt the user to provide a biometric sample using a biometric sensor 402. The biometric sensor in the wireless communication device may capture the biometric sample provided by the user 404. The wireless communication device may determine whether the captured biometric sample is acceptable for comparison to a known biometric sample of the user to verify or authenticate the identity of the user 406. If the captured biometric sample is unacceptable, the wireless communication device may prompt the user to provide a new biometric sample 402. If the captured biometric sample is acceptable, the captured biometric sample may be compared to a known biometric sample of the user stored in a memory device in the wireless communication device 408.

The wireless communication device may determine if the captured biometric sample matches the known biometric sample stored in the wireless communication device 410. If the captured biometric sample does not match the known biometric sample, the wireless communication device may prompt the user to provide a new biometric sample of the user 402. If the captured biometric sample matches the known biometric sample, data stored in a tamperproof storage device of the wireless communication may be extracted 412. The extracted data may then be presented to the user for a preset amount of time on a display 414. The preset amount of time may be user defined or the preset amount of time may be set by the authentication application of the wireless communication device. When the preset amount of time has lapsed, the data may be cleared from the display. The data access may then be ended 416.

Figure 5A:
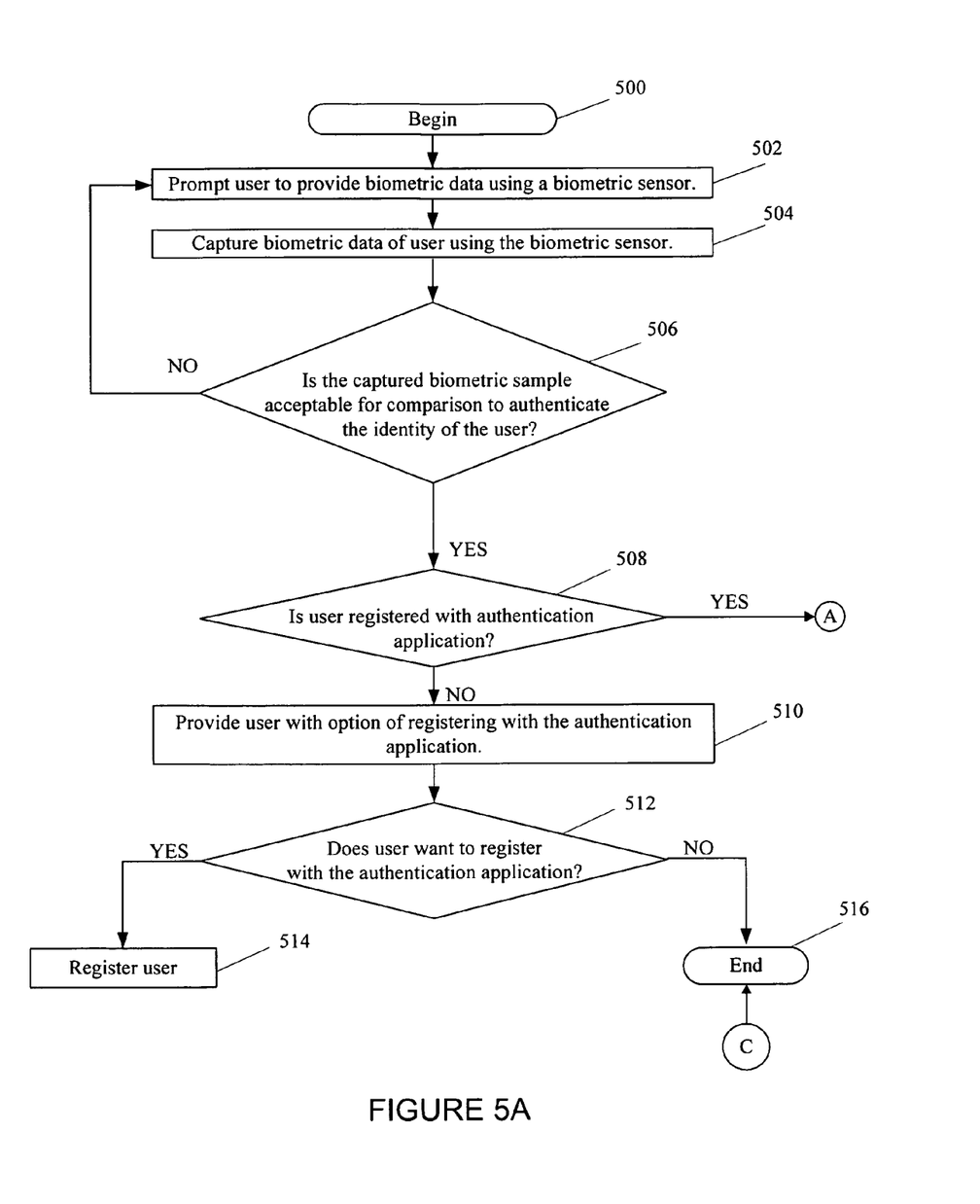
Figure 5B:
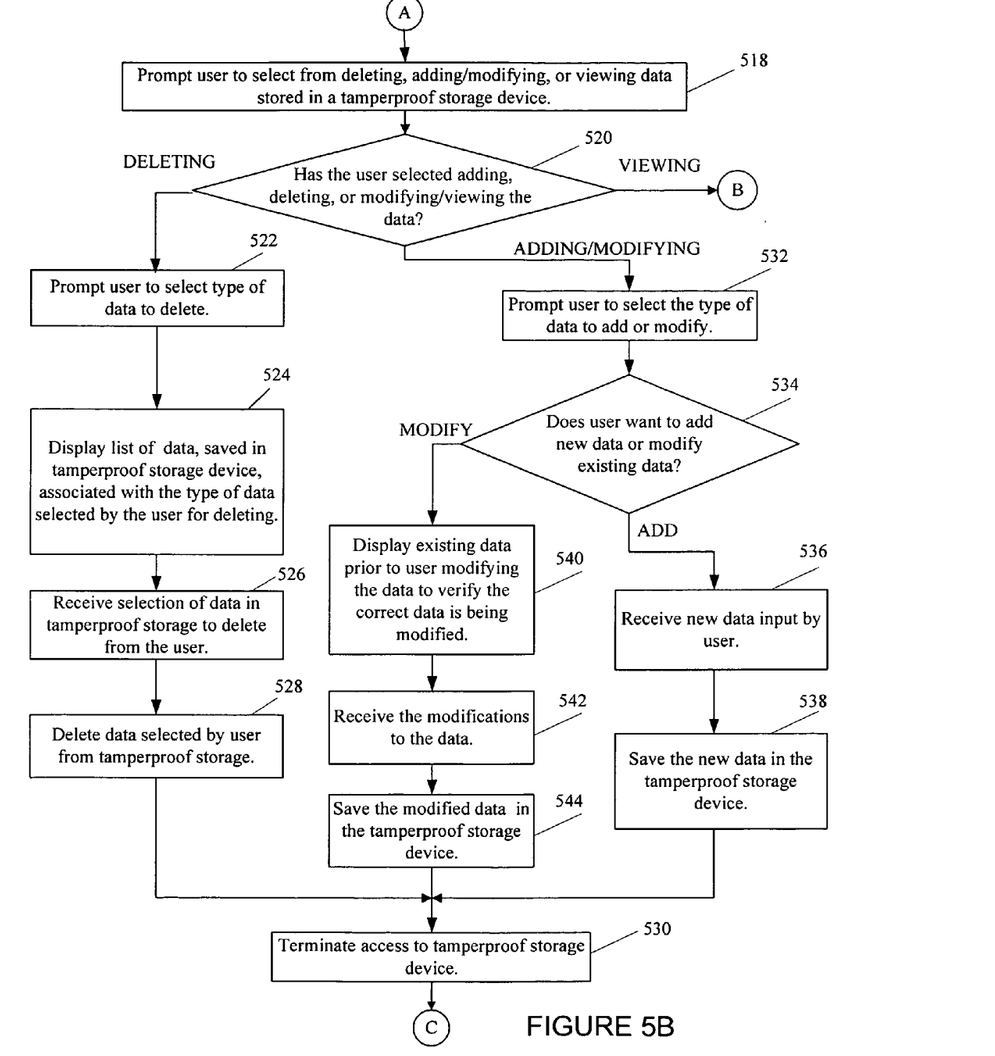
Figure 5C:
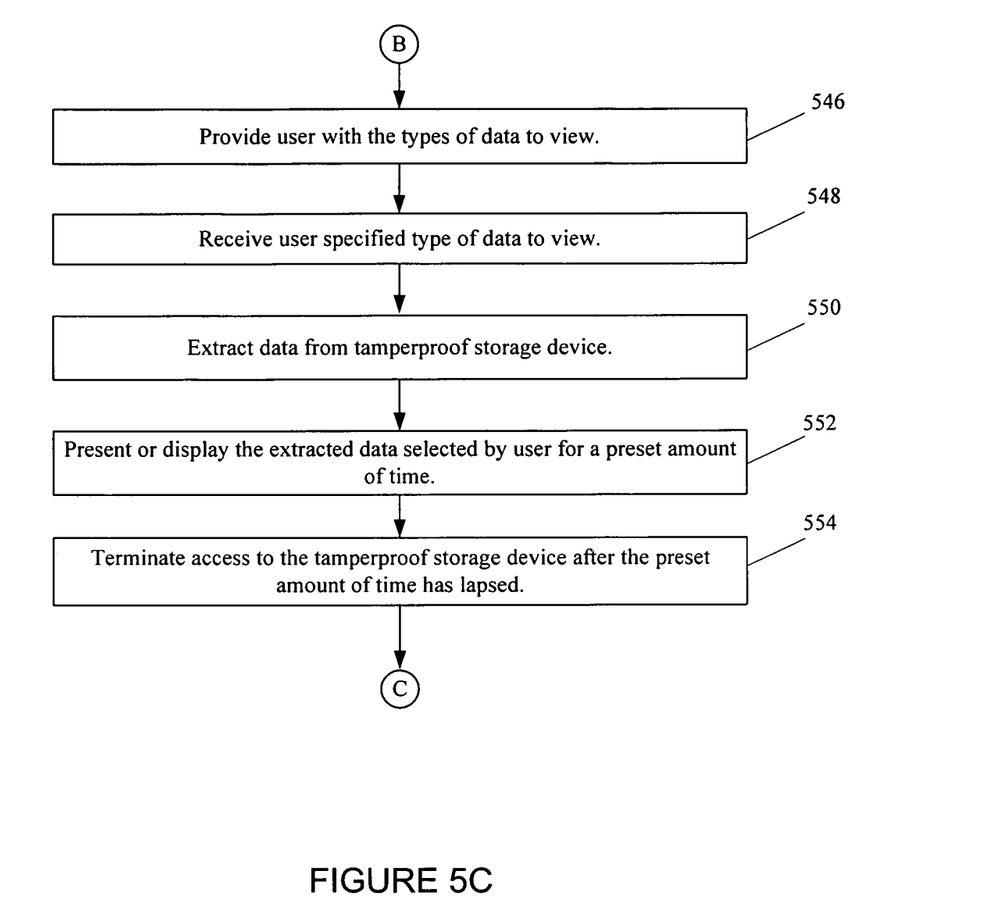

FIG. 5 (comprising FIGS. 5A, 5B, and 5C) is a flow diagram illustrating a method operational in a wireless communication device for deleting, adding, modifying or viewing data in a tamperproof storage device of the wireless communication device 500. The tamperproof storage device may be protected from external access, but may be available to an authentication application of the wireless communication device. Users register with the authentication application which provides access to the data in the tamperproof storage device.

The wireless communication device may prompt the user to provide a biometric sample 502 using a biometric sensor. The biometric sample of the user is captured using the biometric sensor 504. The wireless communication device may determine whether the captured biometric sample is acceptable for comparing to a known biometric sample of the user stored in a memory device of the wireless communication device to verify or authenticate the identity of the user 506. If the captured biometric sample is not acceptable, the wireless communication device may prompt the user to provide a new biometric sample 502. If the captured biometric sample is acceptable, the wireless communication device may determine if the user is registered with the authentication application 508.

If the user is not registered with the authentication application, the wireless communication device may provide the user with an option of registering with the authentication application 510. The wireless communication device may determine if the user wants to register with the authentication application 512. If the user wants to register with the authentication application, the wireless communication device may register the user 514. If the user does not want to register with the authentication application, the wireless communication device may end the authentication application 516.

If the user is registered with the authentication application, the user may be prompted to select whether to delete existing data stored in the tamperproof storage device, adding new data or modify existing data stored in the tamperproof storage device or view data stored in the tamperproof storage device 518. The wireless communication device may determine if the user has selected deleting data, adding/modifying data or viewing data in the tamperproof storage device 520.

If the user has selected deleting data stored in the tamperproof storage device, the user may be prompted to select the type of data to delete 522. The type of data may include usernames, passwords, bank accounts, insurance policy numbers, credit card numbers and the like. A list of data saved in the tamperproof storage device associated with the type of data selected by the user to delete may be displayed 524. From the displayed list of data, the user may select the data to delete. The wireless communication device may receive the data to delete from the tamperproof storage device which was selected by the user 526. The wireless communication device may delete the data selected by the user from the tamperproof storage device 528. The wireless communication device may then terminate access to the tamperproof storage device 530 and may end the authentication application 516.

If the user has selected adding/modifying data, the user may be prompted to select the type of data to add to the tamperproof storage device or existing data in the tamperproof storage device to modify 532. The wireless communication device may determine if the user wants to add new data or modify existing data 534. If the user wants to add new data, the wireless communication device may receive the new data, input by the user, to store or save in the tamperproof storage device 536. The new data may be stored or saved in the tamperproof storage device of the wireless communication device 538. The wireless communication device may then terminate access to the tamperproof storage device 530 and may end the authentication application 516.

If the user wants to modify existing data, the wireless communication device may display the existing data to modify prior to the user modifying the data to verify that that correct data is being modified 540. The wireless communication device may receive the modifications to the data 542. The modified data may be saved in the tamperproof storage device 544. The wireless communication device may then terminate access to the tamperproof storage device 530 and may end the authentication application 516.

If the user has selected viewing data stored in the tamperproof storage device, the wireless communication device may provide the user with the types of data to view 546. The wireless communication device may receive the type of data to view selected or specified by the user 548. The data selected by the user may be extracted from the tamperproof storage device 550 and presented or displayed for a preset amount of time on a display of the wireless communication device 552. When the preset amount of time has lapsed, the data may be cleared from the display. The wireless communication device may then terminate access to the tamperproof storage device 554 and may end the authentication application 516. The user may access the tamperproof storage device after termination by providing another biometric sample to authenticate his identity. If authentication is successful, the user will be granted access again for the preset amount of time.

One or more of the components, steps, and/or functions illustrated in FIGS. 1, 2, 3, 4, and/or 5 may be rearranged and/or combined into a single component, step, or function or embodied in several components, steps, or functions. Additional elements, components, steps, and/or functions may also be added without departing from the invention. The apparatus, devices, and/or components illustrated in FIGS. 1 and/or 2 may be configured to perform one or more of the methods, features, or steps described in FIGS. 3, 4 and/or 5. The novel algorithms described herein may be efficiently implemented in software and/or embedded hardware.

Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. For example, some implementations of the invention may be performed on computers, personal assistant devices, digital organizers, etc.

It should be noted that the foregoing embodiments are merely examples and are not to be construed as limiting the invention. The description of the embodiments is intended to be illustrative, and not to limit the scope of the claims. As such, the present teachings can be readily applied to other types of apparatuses and many alternatives, modifications, and variations will be apparent to those skilled in the art.

The invention claimed is:

1. A wireless communication device comprising:

A wireless transceiver for facilitating communication between the wireless communication device and other devices over a wireless communication system:

a biometric sensor for capturing a biometric sample of a user;

a memory device, coupled to the biometric sensor, for storing a known biometric sample of the user;

a tamperproof storage device for storing data, wherein the tamperproof storage device is a separate device from the memory device;

a processing circuit coupled to the wireless transceiver, the tamperproof storage device, and the memory device, the processing circuit configured to compare the captured biometric sample to the known biometric sample stored in the memory device;

extract data from the tamperproof storage device if the captured biometric sample matches the known biometric sample;

present the extracted data to the user for a preset amount of time, wherein the present amount of time is extended if an additional authenticated biometric sample is also presented, and wherein the additional authenticated biometric sample is different from the captured biometric sample; and prompt the user to select from one of deleting, adding, or modifying the extracted data.

2. The device of claim 1, further comprising a user interface, coupled to the processing circuit, for inputting the data stored in the tamperproof storage device.

3. The device of claim 2, wherein the user interface is a keypad.

4. The device of claim 1, wherein the extracted data is user defined.

5. The device of claim 1, wherein the data includes at least one of credit card numbers, passwords, secret locker code numbers, automated teller machine (ATM) person identification numbers (PIN), insurance policy numbers, social security numbers and driver license numbers.

6. The device of claim 1, wherein the processing circuit is further configured to set the preset amount of time.

7. The device of claim 1, further comprising a display for presenting the extracted data.

8. The device of claim 1, wherein the preset amount of time is user defined in an initial configuration stage.

9. The device of claim 1, wherein the biometric sensor is selected from the group consisting of a fingerprint scanner, an iris scanner, facial recognition device, a hand scanner and a voice recognition device.

10. The device of claim 1, wherein the tamperproof storage device is a protected area in the memory device, protected from external access and available only to an authentication application of the processing circuit.

11. The device of claim 1, further comprising an authentication module within the processing circuit for comparing the captured biometric sample of the user to the known biometric sample of the user to authenticate the identity of the user.

12. The device of claim 1, wherein the processing circuit is further configured to:

prompt the user to provide the biometric sample using the biometric sensor.

13. The device of claim 1, wherein the processing circuit is further configured to:

determine whether the captured biometric sample is acceptable for comparison to authenticate the identity of the user; and prompt the user to provide another biometric sample using the biometric sensor if the sample is not acceptable.

14. The wireless communication device of claim 1, wherein the processing circuit is further configured to:

determine whether the user is registered with an authentication application of the wireless communication device; and prompt the user with an option to register with the authentication application after determining that the user is not registered with the authentication application.

15. A method operational on a wireless communication device, comprising:

facilitating wireless communications between the wireless communication device and other devices over a wireless communication system;

storing data in a tamperproof storage device within the wireless communication device, wherein the tamperproof storage device is a separate device from the memory device;

capturing a biometric sample of a user;

comparing the captured biometric sample to a known biometric sample of the user stored in a memory device;

extracting data from the tamperproof storage device if the captured biometric sample matches the known biometric sample;

presenting the extracted data to the user for a preset amount of time, wherein the preset amount of time is extended if an additional authenticated biometric sample is also presented, and wherein the additional authenticated biometric sample is different from the captured biometric sample; and prompting the user to select from one of deleting, adding, or modifying the extracted data.

16. The method of claim 15, further comprising inputting the data stored in the tamperproof storage device using a user interface.

17. The method of claim 15, wherein the extracted data is user defined.

18. The method of claim 15, wherein the data includes at least one of credit card numbers, passwords, secret locker code numbers, automated teller machine (ATM) person identification numbers (PIN), insurance policy numbers, social security numbers and driver license numbers.

19. The method of claim 15, further comprising defining the preset amount of time.

20. The method of claim 15 further comprising presenting the extracted data for the preset amount of time on a display.

21. The method of claim 20, further comprising clearing the extracted data from the display after the preset amount of time has lapsed.

22. The method of claim 15, wherein the data in the tamperproof storage device is protected from external access and available only to an authentication application of the wireless communication device.

23. The method of claim 15, further comprising prompting the user to provide the biometric sample using the biometric sensor.

24. The method of claim 15, further comprising:

determining whether the captured biometric sample is acceptable for comparison to authenticate the identity of the user; and prompting the user to provide another biometric sample if the sample is not acceptable.

25. A wireless communication device comprising:

means for facilitating communications between the wireless communication device and other devices over a wireless communication system;

means for capturing a biometric sample of a user;

means for storing data in a tamperproof storage device, wherein the tamperproof storage device is a separate device from the memory device;

means for comparing the captured biometric sample to the known biometric sample stored in a memory device;

means for presenting the extracted data to the user for a preset amount of time, wherein the preset amount of time is extended if an additional authenticated biometric sample is also presented, and wherein the additional authenticated biometric sample is different from the captured biometric sample; and means for prompting the user to select from one of deleting, adding, or modifying the extracted data.

26. The device of claim 25, further comprising means for inputting the data stored in the tamperproof storage device.

27. The device of claim 25, wherein the data includes at least one of credit card numbers, passwords, secret locker code numbers, automated teller machine (ATM) person identification numbers (PIN), insurance policy numbers, social security numbers and driver license numbers.

28. The device of claim 25, wherein the preset amount of time is user defined.

29. The device of claim 25, wherein the tamperproof storage device is a protected area in the memory device which is protected from external access.

30. A non-transitory computer-readable medium comprising instructions for accessing data in a wireless communication device which when executed by a processor causes the processor to:
 facilitate communications between the wireless communication device and other devices over a wireless communication system;
 store data in a tamperproof storage device within the wireless communication device, wherein the tamperproof storage device is a separate device from the memory device;
 capture a biometric sample of a user;
 compare the captured biometric sample to a known biometric sample stored in a memory device;
 extract data from the tamperproof storage device if the captured biometric sample matches the known biometric sample;
 present the extracted data to the user for a preset amount of time, wherein the preset amount of time is extended if an additional biometric sample is also presented, and wherein the additional authenticated biometric is different from the captured biometric sample; and
 prompt the user to select one of deleting, adding, or modifying the extracted data.

31. The non-transitory computer-readable medium of claim 30, further comprising instructions which when executed by the processor causes the processor to input the data in the tamperproof storage using a user interface.

32. The non-transitory computer-readable medium of claim 30, further comprising instructions which when executed by the processor causes the processor to define the preset amount of time.

33. The non-transitory computer-readable medium of claim 30, further comprising instructions which when executed by the processor causes the processor to clear the extracted data from a display after the preset amount of time has lapsed.

34. A wireless communication device comprising:
 a wireless transceiver for facilitating communication between the wireless communication device and other devices over a wireless communication system;
 a biometric sensor for capturing a biometric sample of a user;
 a memory device coupled to the biometric sensor, for storing a known biometric sample of the user;
 a tamperproof storage device for storing data, wherein the tamperproof storage device is a separate device from the memory device; and
 a processing circuit coupled to the wireless transceiver, the tamperproof storage device, and the memory device, the processing circuit configured to
  compare the captured biometric sample to the known biometric sample stored in the memory device;
  extract data from the tamperproof storage device if the captured biometric sample matches the known biometric sample;
  present the extracted data to the user for a preset amount of time after which time access to the extracted data by the user is terminated by the wireless communication device, wherein the preset amount of time is extended if an additional authenticated biometric sample is also presented, and wherein the additional authenticated biometric sample is different from the captured biometric sample; and
  prompt the user to select from one of deleting, adding, or modifying the extracted data.

35. A method operational on a wireless communication device, comprising:
 facilitating wireless communications between the wireless communication device and other devices over a wireless communication system;
 storing data in a tamperproof storage device within the wireless communication device, wherein the tamperproof storage device is a separate device from a memory device for storing a known biometric sample;
 capturing a biometric sample of a user;
 comparing the captured biometric sample to the known biometric sample of the user stored in the memory device;
 extracting data from the tamperproof storage device if the captured biometric sample matches the known biometric sample;
 presenting the extracted data to the user for a preset amount of time after which time access to the extracted data by the user is terminated by the wireless communication device, wherein the preset amount of time is extended if an additional authenticated biometric sample is also presented, and wherein the additional authenticated biometric sample is different from the captured biometric sample; and
 prompting the user to select from one of deleting, adding, or modifying the extracted data.

* * * * *